(12) United States Patent
Huang et al.

(10) Patent No.: US 11,614,719 B2
(45) Date of Patent: Mar. 28, 2023

(54) WIDE-FIELD-OF-VIEW ANTI-SHAKE HIGH-DYNAMIC BIONIC EYE

(71) Applicant: Beijing Institute of Technology, Beijing (CN)

(72) Inventors: Qiang Huang, Beijing (CN); Xiaopeng Chen, Beijing (CN); Yang Xu, Beijing (CN); Zhangguo Yu, Beijing (CN); Xuechao Chen, Beijing (CN); Weimin Zhang, Beijing (CN)

(73) Assignee: Beijing Institute of Technology, Beijing (CN)

( * ) Notice: Subject to any disclaimer, the term of this patent is extended or adjusted under 35 U.S.C. 154(b) by 656 days.

(21) Appl. No.: 16/742,542

(22) Filed: Jan. 14, 2020

(65) Prior Publication Data
US 2022/0258337 A1   Aug. 18, 2022

(30) Foreign Application Priority Data

Jul. 25, 2019   (CN) .......................... 201910679801.8
Jul. 25, 2019   (CN) .......................... 201910679805.6

(51) Int. Cl.
*B25J 9/16* (2006.01)
*H04N 5/232* (2006.01)
(Continued)

(52) U.S. Cl.
CPC .......... *G05B 13/048* (2013.01); *B25J 9/1648* (2013.01); *B25J 17/0283* (2013.01); *G05B 13/04* (2013.01);
(Continued)

(58) Field of Classification Search
CPC .... B25J 17/0283; B25J 9/1607; B25J 9/1648; G05B 13/04; G05B 13/042; G05B 13/048;
(Continued)

(56) References Cited

U.S. PATENT DOCUMENTS

2015/0165336 A1   6/2015   Michalowski et al.
2016/0248949 A1   8/2016   Godler et al.

FOREIGN PATENT DOCUMENTS

CN   1492668 A    4/2004
CN   103072140 A   5/2013
(Continued)

OTHER PUBLICATIONS

Zhu, Qihang et al.; Research and simulation of optimal control for sampling manipulator based on Iqr; "Automation and Instrumentation" 2018 No. 5 (Total Issue 223); (C)1994-2019 China Academic Journal Electronic Publishing House.

*Primary Examiner* — William C Vaughn, Jr.
*Assistant Examiner* — Naod W Belai
(74) *Attorney, Agent, or Firm* — Novick, Kim & Lee, PLLC; Allen Xue (57) ABSTRACT

The present application discloses a wide-field-of-view anti-shake high-dynamic bionic eye. A trajectory tracking method based on a bionic eye robot includes: establishing a linear model according to a bionic eye robot; establishing a full state feedback control system on the basis of the linear model; in the full state feedback control system, acquiring an angle and an angular acceleration required for a joint in a target tracking process of the bionic eye on the basis of a preset trajectory expectation value and a preset joint angle expectation value; the method further includes: adopting a linear quadratic regulator (LQR) to calculate a parameter K in the full state feedback control system, and minimizing energy consumption by establishing an energy function, so as to optimize the coordinated head-eye motion control of the linear bionic eye. The present application achieves the optimal control of the target tracking.

20 Claims, 4 Drawing Sheets

(51) Int. Cl.
  *G05B 19/4155* (2006.01)
  *G05B 13/04* (2006.01)
  *B25J 17/02* (2006.01)
  *H04N 23/695* (2023.01)
  *H04N 23/68* (2023.01)

(52) U.S. Cl.
  CPC ....... *G05B 13/042* (2013.01); *G05B 19/4155* (2013.01); *H04N 23/6812* (2023.01); *H04N 23/695* (2023.01); *B25J 9/1607* (2013.01); *G05B 2219/40604* (2013.01)

(58) Field of Classification Search
  CPC ...... G05B 19/4155; G05B 2219/40604; H04N 5/23258; H04N 5/23299
  See application file for complete search history.

(56) References Cited

FOREIGN PATENT DOCUMENTS

| | | | |
|---|---|---|---|
| CN | 103963074 A |   | 8/2014 |
| CN | 105631859 A | * | 6/2016 |
| CN | 105631859 A |   | 6/2016 |
| CN | 105912007 A |   | 8/2016 |
| CN | 106393179 A |   | 2/2017 |
| CN | 207242056 U |   | 4/2018 |
| CN | 108128484 A |   | 6/2018 |
| CN | 108375903 A |   | 8/2018 |
| CN | 109848983 A |   | 6/2019 |
| CN | 208982932 U |   | 6/2019 |
| CN | 107923524 B |   | 3/2020 |
| JP | 2005237522 A |   | 9/2005 |

* cited by examiner

Fig. 6 ical field, in particular to a wide-field-of-view anti-shake high-dynamic bionic eye.

WIDE-FIELD-OF-VIEW ANTI-SHAKE HIGH-DYNAMIC BIONIC EYE

TECHNICAL FIELD

The present application relates to the field of bionic eyes, in particular to a wide-field-of-view anti-shake high-dynamic bionic eye.

BACKGROUND

For a bionic robot, coordinated head-eye motion control is helpful to the improvement of visual information acquisition capability of a bionic eye with a wider angle.

The inventor finds that the method of acquiring the tracking effect of the bionic eye robot and how to achieve the optimal control of the target tracking has poor processing effects.

For the problem of poor effects in the processing method of the bionic eye robot in the related art, no effective solution is proposed at present.

SUMMARY

The main object of the present application is to provide a wide-field-of-view anti-shake high-dynamic bionic eye, so as to solve the problem of poor effects in the processing method of the bionic eye robot.

To achieve the above object, according to one aspect of the present application, provided is a trajectory tracking method based on a bionic eye robot, for a multi-degree-of-freedom linear bionic eye, wherein the multi-degree-of-freedom refers to the degree of freedom of a neck joint and the degree of freedom of a single eyeball joint.

The trajectory tracking method based on a bionic eye robot according to the present application includes: establishing a linear model according to a bionic eye robot, wherein the linear model includes at least a gravity vector and a joint vector; establishing a full state feedback control system on the basis of the linear model, wherein the full state feedback control system includes a state feedback controller and a full state feedback control system expression, wherein an angle and an angular velocity state of each joint of the bionic eye are treated as state vectors of the state feedback controller; in the full state feedback control system, acquiring an angle and an angular acceleration required for a joint in a target tracking process of the bionic eye on the basis of a preset trajectory expectation value and a preset joint angle expectation value; the method further includes: adopting a linear quadratic regulator (LQR) to calculate a parameter K in the full state feedback control system, and minimizing energy consumption by establishing an energy function, so as to optimize the coordinated head-eye motion control of the linear bionic eye.

Further, a system input moment matrix in the linear model established according to the bionic eye robot includes:

$$u = M(q)\ddot{q} + C(q,\dot{q})\dot{q} + B\dot{q} + Gq$$

Wherein M is a symmetric positive definite inertia matrix, G is a gravity vector, C denotes a broad sense centrifugal force and Coriolis force matrix, q is a broad sense coordinate matrix, namely a joint vector, and B is a friction coefficient matrix.

Furthermore, the inertia matrix is:

$$M(q) = D(q) + J$$

Wherein J is a diagonal matrix the diagonal elements of which are $r_k^2 J_{m_k}$, $r_k$ is a variable-speed ratio of a motor k, and $J_{m_k}$ is a moment of inertia of the motor k.

Further, the full state feedback control system expression of the full state feedback control system established on the basis of the linear model includes:

$$\dot{x} = Ax + Bu$$

$$y = Cx$$

And the input of the state feedback controller is:

$$u = Kx$$

A, B and C respectively represent a matrix.

Further, the preset trajectory expectation value and the preset joint angle expectation value include:

Setting expectation motion trajectories of each joint, wherein x* and u* are preset trajectory expectation values, then:

$$x^* = M_x y_d$$

$$u^* = M_u y_d$$

Wherein $y_d$ is a given joint angle expectation value, that is, the angle and the angular acceleration required for a joint in a target tracking process of the bionic eye is solved through the expected angle value, $M_x$ and $M_u$.

Further, adopting a linear quadratic regulator (LQR) to calculate a parameter K in the full state feedback control system, and minimizing energy consumption by establishing an energy function, include:

Establishing the energy function on the basis of the LQR regulator;

$$J = \tfrac{1}{2}\int_0^{28}(\Delta x^T Q \Delta x + \Delta u^T R \Delta u)dt$$

Wherein the matrix Q is a weight of a performance index function to a state variable, and is a diagonal matrix; and the matrix R is a weight of a control variable, is also a diagonal matrix, and is positive definite.

To achieve the above object, according to another aspect of the present application, provided is a wide-field-of-view anti-shake high-dynamic bionic eye, including a binocular bionic eye and a neck mechanism, wherein the neck mechanism drives the motion of the binocular bionic eye, the neck mechanism includes a three-degree-of-freedom neck joint, the binocular bionic eye includes two two-degree-of-freedom eyeball mechanisms; wherein the motion of the binocular bionic eye under the drive of the neck mechanism refers to an up-and-down motion, a left-and-right motion, or a rotary motion.

Further, when the neck mechanism drives the motion of the binocular bionic eye, the bionic eye is used for binocular tracking.

Further, when the neck mechanism drives the motion of the binocular bionic eye, the bionic eye is used to acquire full scene visual information.

Further, the binocular bionic eye includes a right eyeball mechanism and a left eyeball mechanism which have the same internal structure, and a bracket, wherein the right eyeball mechanism and the left eyeball mechanism are respectively symmetrically mounted at the ends of the bracket.

Further, the eyeball mechanism includes an eyeball, a camera module, a first eyeball motor, and a second eyeball motor, wherein the camera module is mounted in the eyeball, the first eyeball motor is used to control the left-and-right motion of the eyeball, and the second eyeball motor is used to control the up-and-down motion of the eyeball.

Further, the neck mechanism further includes a first neck motor, a second neck motor, and a third neck motor, wherein the first neck motor is used to drive the binocular bionic eye to execute a left-and-right rotary motion; the second neck motor is used to drive the binocular bionic eye to execute a left-and-right oscillating motion; the third neck motor is used to drive the binocular bionic eye to execute an up-and-down pitching motion; wherein the output shafts of the first neck motor, the second neck motor and the third neck motor are perpendicular to each other.

Further, the anti-shake high-dynamic bionic eye further includes a motor, wherein the motor integrates an absolute code disk, such that the binocular bionic eye and the neck mechanism can be controlled at the positions with different degrees of freedom.

Further, the bionic eye further includes a base and a support arm, wherein the neck mechanism is connected to the binocular bionic eye via a neck cross-linking device, the neck mechanism is connected to the base; the neck mechanism is connected to the support arm; the first neck motor of the neck mechanism is fixed above the base via a screw, and an outer rotor of the first neck motor is connected to a lower end of a primary support arm; the second neck motor is fixed at an upper end of the primary support arm via a screw, and an outer rotor thereof is connected to the neck cross-linking device; the third neck motor is fixed in the neck cross-linking device via a screw, and an outer rotor thereof is fixed at an intermediate connection of the bracket via a screw.

To achieve the above object, according to still another aspect of the present application, provided is a bionic eye robot, including a computer program for, when executed by a processor, realizing the steps of the trajectory tracking method based on a bionic eye robot.

In the embodiments of the present application, the wide-field-of-view anti-shake high-dynamic bionic eye adopts the mode of establishing a linear model according to a bionic eye robot, establishes a full state feedback control system on the basis of the linear model, and achieves the object of acquiring, in the full state feedback control system, an angle and an angular acceleration required for a joint in a target tracking process of the bionic eye on the basis of a preset trajectory expectation value and a preset joint angle expectation value, thus realizing the technical effect of minimizing energy consumption by establishing an energy function so as to optimize the coordinated head-eye motion control of the linear bionic eye, and solving the technical problem that the processing method of the bionic eye robot has poor effects.

In the embodiments of the present application, the wide-field-of-view anti-shake high-dynamic bionic eye adopts a binocular bionic eye and a neck mechanism, wherein the neck mechanism drives the motion of the binocular bionic eye; the neck mechanism includes a three-degree-of-freedom neck joint; the binocular bionic eye includes two two-degree-of-freedom eyeball mechanisms. Therefore, the present application achieves the object that the motion of the binocular bionic eye under the drive of the neck mechanism refers to an up-and-down motion, a left-and-right motion, a rotary motion, or a combined motion of the three motions above, thus achieving the technical effects of simplifying structure, realizing effective anti-shake and improving a dynamic performance, and solving the technical problem of complex bionic eye structure and poor anti-shake and dynamic performances.

BRIEF DESCRIPTION OF THE DRAWINGS

The drawings forming a part of the present application provide a further understanding to the present application, enabling the other features, objects and advantages of the present application to be more obvious. The exemplary embodiments of the present application, the drawings and the descriptions thereof are used to explain the present application, but are not intended to unduly limit the present application. In the drawings.

DETAILED DESCRIPTION OF THE EMBODIMENTS

To enable a person skilled in the art to better understand the solution of the present application, the technical solutions in the embodiments of the present application will be clearly and completely described hereafter in combination with the drawings in the embodiments of the present application. It is apparent that the described embodiments are only a part of the embodiments of the present application, but not the whole. On the basis of the embodiments of the present application, all the other embodiments obtained by a person skilled in the art without involving an inventive effort should be all concluded in the protection scope of the present application.

It should be noted that the terms "first", "second" and the like in the specification and claims of the present application and the drawings above are used to distinguish similar objects, but not to describe a specific order or precedence. It should be understood that the data used in such a manner can be interchanged under appropriate situations, so as to facilitate the understanding of the embodiments of the present application described herein. In addition, the terms "comprise", "is provided with" and any variations thereof are intended to cover non-exclusive containing, for example, a process, method, system, product or device comprising a series of steps or units are not limited to comprise the explicitly listed steps or units, but can also comprise other steps or units that are not explicitly listed or inherent in the process, method, product or device.

It should be noted that, in the case of no conflicts, the embodiments in the present application and the features in the embodiments can be mutually combined. The present application will be elaborated hereafter with reference to the drawings and in combination with the embodiments, The trajectory tracking method based on a bionic eye robot in the embodiments of the present application introduces LQR linear quadratic optimal controller into head-eye coordinated motion control of linear bionic eyes with N degrees of freedom. The present application further realizes optimal coordinated head-eye motion control, can steady the head-eye motion of the bionic eye, and minimizes the energy consumption in the process of target tracking.

Figure 1:
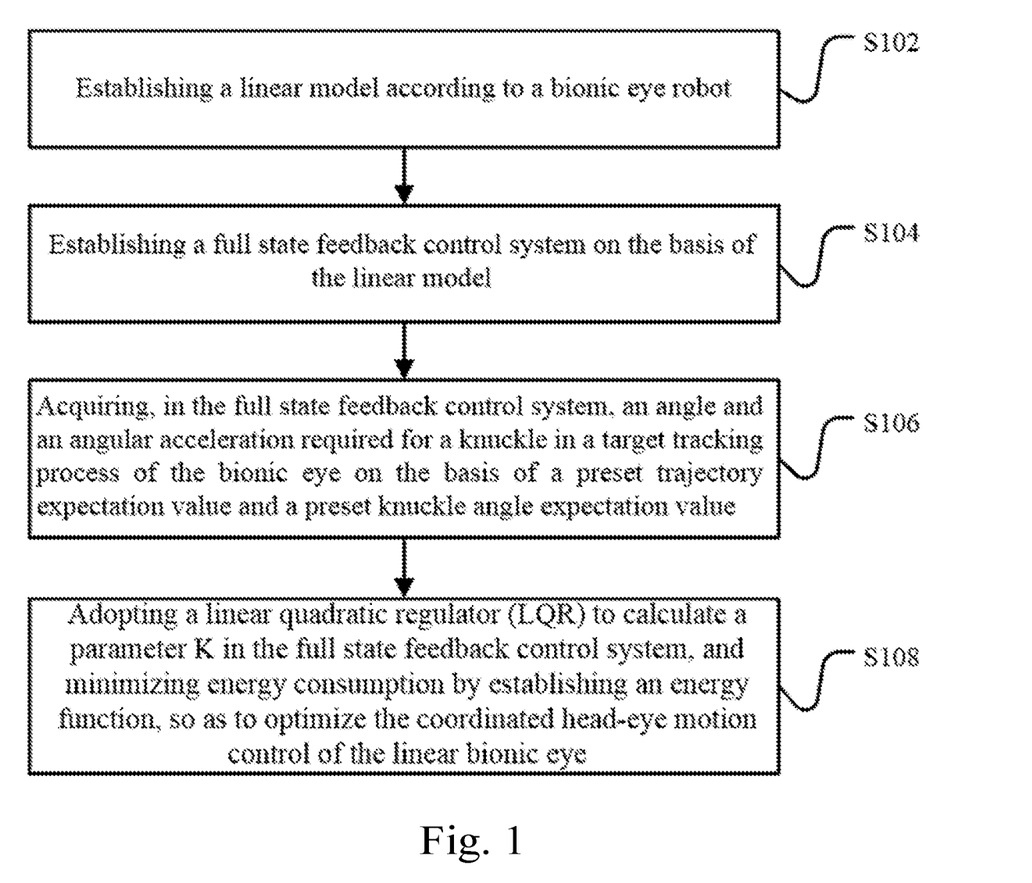
FIG. 1 is a flow chart of the trajectory tracking method based on a bionic eye robot according to one embodiment of the present application.

As shown in FIG. 1, the method includes step S102 to step S106 as follows:

Step S102, establishing a linear model according to a bionic eye robot,

The linear model includes at least a gravity vector and a joint vector.

The method in the embodiments of the present application is used for a multi-degree-of-freedom linear bionic eye, wherein the multi-degree-of-freedom refers to the degree of freedom of a neck joint and the degree of freedom of a single eyeball joint.

Specifically, for an n-degree-of-freedom linear bionic eye, N is the sum of the degree of freedom of the neck joint and the degree of freedom of a single eyeball joint.

It should be noted that the bionic eye robot can establish the linear model according to various modes, which is not specifically limited in the embodiments of the present application.

Step S104, establishing a full state feedback control system on the basis of the linear model;

The full state feedback control system includes a state feedback controller and a full state feedback control system expression.

An angle and an angular velocity state of each joint of the bionic eye are treated as state vectors of the state feedback controller.

A mathematical model is established according to the full state feedback control system.

Specifically, for the linear model established by the bionic eye robot, a special system is introduced to input the expression.

Step S106, in the full state feedback control system, acquiring an angle and an angular acceleration required for a joint in a target tracking process of the bionic eye on the basis of a preset trajectory expectation value and a preset joint angle expectation value;

In the full state feedback control system, the preset trajectory expectation value and the preset joint angle expectation value are adopted to solve the angle and the angular acceleration required for the joint in the target tracking process of the bionic eye.

Step S108, adopting a linear quadratic regulator (LQR) to calculate a parameter K in the full state feedback control system, and minimizing energy consumption by establishing an energy function, so as to optimize the coordinated head-eye motion control of the linear bionic eye, The parameter K is a system parameter.

In the embodiments of the present application, the linear quadratic regulator (LQR) is used to solve the parameter K of the full state feedback control system.

As can be seen from the descriptions above, the present application achieves the following technical effects:

In the embodiments of the present application, a linear model is established according to a bionic eye robot; a full state feedback control system is established on the basis of the linear model; the present application achieves the object of acquiring, in the full state feedback control system, an angle and an angular acceleration required for a joint in a target tracking process of the bionic eye on the basis of a preset trajectory expectation value and a preset joint angle expectation value, thus realizing the technical effect of minimizing energy consumption by establishing an energy function so as to optimize the coordinated head-eye motion control of the linear bionic eye, and solving the technical problem that the processing method of the bionic eye robot has poor effects.

According to the embodiments of the present application, as an optional selection in the embodiments, the system input moment matrix in the linear model established according to the bionic eye robot includes:

$$u = M(q)\ddot{q} + C(\dot{q},q)\dot{q} + Bq + Gq$$

wherein M is a symmetric positive definite inertia matrix; G is a gravity vector, C denotes a broad sense centrifugal force and Coriolis force matrix, q is a broad sense coordinate matrix, namely a joint vector, and B is a friction coefficient matrix.

Furthermore, the inertia matrix is:

$$M(q) = D(q) + J$$

Wherein J is a diagonal matrix the diagonal elements of which are $r_k^2 J_{m_k}$; $r_k$ is a variable-speed ratio of a motor k, and $J_{m_k}$ is a moment of inertia of the motor k.

Specifically, taking a five-degree-of-freedom bionic eye as an example, the degree of freedom of the neck is 3, and the degree of freedom of the eye is 2. For the linear model, the formula is as follows:

$$M(q)\ddot{q} + C(q,\dot{q})\dot{q} + B\dot{q} + Gq = u \tag{1}$$

Wherein $M_{5 \times 5}$ is a symmetric positive definite inertia matrix, $G_{5 \times 5}$ is a gravity vector, $C_{5 \times 5}$ denotes a broad sense centrifugal force and Coriolis force matrix, $q_{5 \times 1}$ is a broad sense coordinate matrix, herein is a joint vector; and B is a friction coefficient matrix, in order to simplify, let B be 0, and $u_{5 \times 1}$ is a system input moment matrix.

Furthermore, the inertia matrix is set as $M(q) = D(q) + J$ wherein J is a diagonal matrix the diagonal elements of which are $r_k^2 J_{m_k}$, $r_k$ is a variable-speed ratio of a motor k, and $J_{m_k}$ is a moment of inertia of the motor k.

The calculation formula of the inertia matrix D(q) is:

$$D(q) = \sum_{i=1}^{5} \{m_i J_{v_i}(q)^T J_{v_i}(q) + J_{\omega_i}(q)^T R_i(q) I_i R_i(q)^T J_{\omega_i}(q)\}$$

Wherein $J_{v_i}(q)$ is a linear velocity Jacobian matrix of a link i, and $J_{\omega_i}(q)$ is an angular velocity Jacobian matrix of the link i. $m_i$ is the mass of the link i; $R_i(q)$ is a rotation matrix for converting the coordinate system of the link i to the polar coordinate system; and is an inertia matrix of the link i with respect to the link coordinate system.

The elements (k, j) in the matrix $C(q,\dot{q})$ are defined as:

$$C_{k,j} = \sum_{i=1}^{5} \frac{1}{2} \left\{ \frac{\partial d_{k,j}}{\partial q_i} + \frac{\partial d_{k,i}}{\partial q_j} - \frac{\partial d_{i,j}}{\partial q_k} \right\} \dot{q}_i$$

Wherein $d_{i,j}$ is the elements (i, j) in the n*n inertia matrix D(q).

Furthermore, the gravity vector Gq is defined as:

$G_{5 \times 5} = \text{diag}\{g_1(q), \ldots, g_5(q)\}$

Since $M_{n \times n}$ is a positive definite matrix, that is an invertible matrix, let $$\Phi = M^{-1} \tag{2}$$

Then, it can be derived from (1) and (2) that:

$$\ddot{q} = \Phi u - \Phi Gq - \Phi C\dot{q} \tag{3}$$

Figure 3:
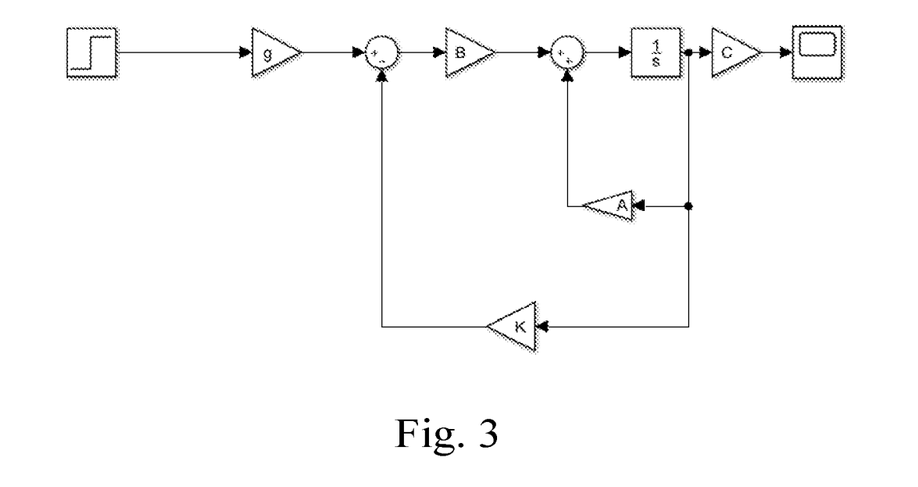
FIG. 3 is a schematic diagram of the full state feedback control system.

According to the embodiment of the present application, as an optional selection in the embodiments, as shown in FIG. 3, the full state feedback control system expression of the full state feedback control system established on the basis of the linear model includes:

$$\dot{x}=Ax+Bu$$

$$y=Cx$$

And the input of the state feedback controller is:

$$u=-Kx$$

A, B and C respectively represent a matrix.

Specifically,

The full state feedback control system expression of a linear system is:

$$\dot{x}=Ax+Bu \quad (4)$$

$$y=Cx \quad (5)$$

The state feedback controller is:

$$u=-Kx \quad (6)$$

Wherein x is a state vector, and u is an input. The specific expressions of the matrices A, B and C will be derived hereafter:

In combination with the five-degree-of-freedom bionic eye, the state vector x should be the angle and angular velocity of each joint of the bionic eye, therefore, the following formula is introduced:

$$x = \begin{bmatrix} q \\ \dot{q} \end{bmatrix}_{10 \times 1} \quad (7)$$

The formulas (3), (4), (5) and (7) can be considered simultaneously to obtain:

$$A = \begin{bmatrix} 0_{5\times 5} & I_{5\times 5} \\ -\Phi G & -\Phi C(q, \dot{q}) \end{bmatrix}_{10\times 10}$$

$$B = \begin{bmatrix} 0_{n\times n} \\ \Phi \end{bmatrix}_{10\times 5}$$

$$C = [I_{5\times 5} \quad 0_{5\times 5}]_{5\times 10}$$

According to the embodiments of the present application, as an optional selection in the embodiments, the preset trajectory expectation value and the preset joint angle expectation value include:

Setting expectation motion trajectories of each joint, wherein x* and u* are preset trajectory expectation values, then:

$$x^*=M_x y_d$$

$$u^*=M_u y_d$$

Wherein $t_d$ is a given joint angle expectation value, that is, the angle and the angular acceleration required for a joint in a target tracking process of the bionic eye are solved through the expected angle value, $M_x$ and $M_u$.

Specifically, $M_x$ and $M_u$ need to be solved.

If $$\begin{bmatrix} A & B \\ C & 0 \end{bmatrix}$$

is a non-singular matrix, then:

$$\begin{bmatrix} M_x \\ M_u \end{bmatrix} = \begin{bmatrix} A & B \\ C & 0 \end{bmatrix}^{-1} \begin{bmatrix} 0_{10\times 5} \\ I_{5\times 5} \end{bmatrix}$$

Now $$\begin{bmatrix} A & B \\ C & 0 \end{bmatrix}$$

is proved to be a non-singular matrix.

Proof:

$$\begin{bmatrix} A & B \\ C & 0 \end{bmatrix}$$

is expanded to obtain:

$$\begin{bmatrix} 0_{5\times 5} & I_{5\times 5} & 0_{5\times 5} \\ -\Phi G_{5\times 5} & -\Phi C(q, \dot{q})_{5\times 5} & \Phi_{5\times 5} \\ I_{5\times 5} & 0_{5\times 5} & 0_{5\times 5} \end{bmatrix}$$

The determinant of the above-described formula is:

$$\left\| \begin{bmatrix} 0_{5\times 5} & I_{5\times 5} & 0_{5\times 5} \\ -\Phi G_{5\times 5} & -\Phi C(q, \dot{q})_{5\times 5} & \Phi_{5\times 5} \\ I_{5\times 5} & 0_{5\times 5} & 0_{5\times 5} \end{bmatrix} \right\| = 0 + |\Phi_{5\times 5}| + 0 - 0 - 0 - 0 = |\Phi_{5\times 5}| \neq 0$$

Therefore, $$\begin{bmatrix} A & B \\ C & 0 \end{bmatrix}$$

is proved to be a non-singular matrix. Further,

It can be derived from (4) that:

$$\dot{x}^*=Ax+Bu \quad (8)$$

The formulas (4), (8) and (9) are considered simultaneously to obtain:

$$\Delta\dot{x}=A\Delta x+B\Delta u$$

It can be derived from (6) that:

$$\Delta u=-K\Delta x \quad (9)$$

(10) is substituted into (9) to obtain:

$$\Delta\dot{x}=(A-BK)\Delta x=A_c\Delta x$$

According to the embodiment of the present application, as an optional selection in the embodiments, adopting a linear quadratic regulator (LQR) to calculate a parameter K in the full state feedback control system, and minimizing energy consumption by establishing an energy function, include:

Establishing the energy function on the basis of the LQR regulator;

$$J=\frac{1}{2}\int_0^\infty (\Delta x^T Q \Delta x + \Delta u^T R \Delta u) dt$$

Wherein the matrix Q is a weight of a performance index function to a state variable, and is a diagonal matrix; and the matrix R is a weight of a control variable, is also a diagonal matrix, and is positive definite.

Specifically, the parameter K of the full state feedback control system also needs to be solved. The parameter is solved herein by using LQR.

On the basis of the design method of the LQR regulator, the following energy function is selected:

$$J=\frac{1}{2}\int_0^\infty (\Delta x^T Q \Delta x + \Delta u^T R \Delta u)dt$$

An optimal control trajectory should minimize the energy function; the matrix Q is a weight of a performance index function to a state variable, and is a diagonal matrix; and the matrix R is a weight of a control variable, is also a diagonal matrix, and is positive definite.

The matrices Q and R need to be manually selected on the basis of an actual parameter of the bionic eye, and should be simulated and debugged until satisfaction.

The formula used in LQR is as follows:

$$A^T P + PA + Q - PBR^{-1}B^T P = 0 \quad (10)$$

$$K = R^{-1}B^T P \quad (11)$$

Wherein the matrices are already solved hereabove; a matrix P can be solved by substituting the selected matrices Q and R into (11).

The parameter K of the full state feedback control system can be solved by substituting the matrix P into (12).

In another embodiment of the present application, further provided is a bionic eye robot, including a computer program for, when executed by a processor, realizing the steps of the trajectory tracking method based on a bionic eye robot.

It should be noted that the steps shown in a flow chart of the drawings can be executed by a computer system via a set of computer executable instructions; furthermore, although a logic sequence is shown in the flow chart, the steps shown or described can be executed in an order different from the sequence herein under certain circumstances.

Figure 2:
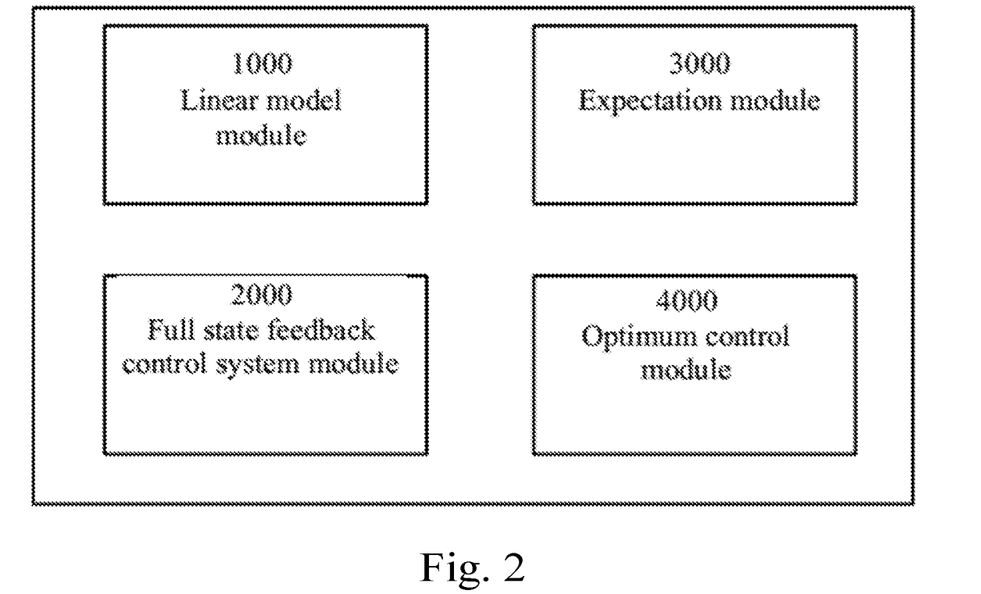
FIG. 2 is a structural schematic view of the trajectory tracking device based on a bionic eye robot according to one embodiment of the present application.

According to the embodiments of the present application, further provided is a bionic eye robot based trajectory tracking device for implementing the above-described method. The device is used for a multi-degree-of-freedom linear bionic eye, wherein the multi-degree-of-freedom refers to the degree of freedom of a neck joint and the degree of freedom of a single eyeball joint. A linear model is established according to a bionic eye robot, wherein the linear model includes at least a gravity vector and a joint vector. As shown in FIG. 2, the device includes: a full state feedback control system model 1000, for establishing a full state feedback control system on the basis of the linear model, wherein the full state feedback control system includes a state feedback controller and a full state feedback control system expression, wherein an angle and an angular velocity state of each joint of the bionic eye are treated as state vectors of the state feedback controller; an expectation module 2000, for acquiring, in the full state feedback control system, an angle and an angular acceleration required for a joint in a target tracking process of the bionic eye on the basis of a preset trajectory expectation value and a preset joint angle expectation value; the device further includes: an optimal control module 3000, for adopting a linear quadratic regulator (LQR) to calculate a parameter K in the full state feedback control system, and minimizing energy consumption by establishing an energy function, so as to optimize the coordinated head-eye motion control of the linear bionic eye.

In another embodiment of the present application, further provided is a bionic eye, including the trajectory tracking device.

The wide-field-of-view anti-shake high-dynamic bionic eye in the embodiments of the present application has a compact structure, a concise wire arrangement, a good anti-shake performance, a light weight, and flexible motion. Moreover, the bionic eye further has binocular tracking and full scene visual information acquisition capabilities.

Figure 4:
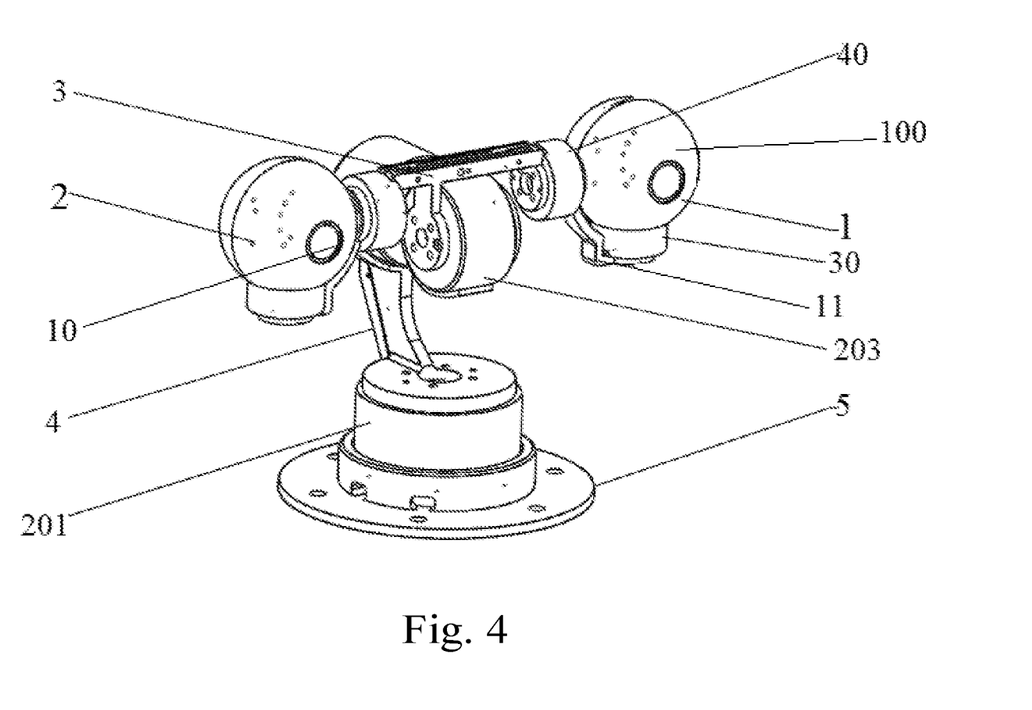
FIG. 4 is a structural schematic view of the bionic eye according to one embodiment of the present application.

As shown in FIG. 4, the wide-field-of-view anti-shake high-dynamic bionic eye in the embodiments of the present application includes a binocular bionic eye 100 and a neck mechanism 200, wherein the neck mechanism 200 drives the motion of the binocular bionic eye 100; the neck mechanism 200 includes a three-degree-of-freedom neck joint; the binocular bionic eye 100 includes two two-degree-of-freedom eyeball mechanisms, wherein the motion of the binocular bionic eye 100 under the drive of the neck mechanism 200 refers to an up-and-down motion, a left-and-right motion, or a rotary motion.

It should be noted that on the basis of relevant researches of human physiology and anatomy, a human eyeball has three degrees of freedom which respectively realize up-and-down rotation, left-and-right rotation, and transverse rolling motion of the eyeball; and a human neck also has three degrees of freedom which respectively realize up-and-down rotation, left-and-right rotation, and left-and-right oscillating motion of the head. The above-described can be applied to the anti-shake high-dynamic bionic eye structure in the embodiments of the present application.

Specifically, the degree of freedom of each binocular bionic eye 100 is 2, since the contribution of the transverse rolling motion of the eyeball to imaging an eyeball tracked object can be almost neglected, the transverse rolling degree of freedom of the eyeball is omitted. In the embodiments of the present application, the two-degree-of-freedom bionic eyeball is used to adjust a visual field in a small range, and the three-degree-of-freedom neck joint is used to adjust a scenario in a large range, thus realizing full scene visual information acquisition.

Optionally, when the neck mechanism 200 drives the motion of the binocular bionic eye 100, the bionic eye is used for binocular tracking.

Optionally, when the neck mechanism 200 drives the motion of the binocular bionic eye 100, the bionic eye is used to acquire full scene visual information.

As can be seen from the descriptions above, the present application achieves the following technical effects:

In the embodiments of the present application, the wide-field-of-view anti-shake high-dynamic bionic eye adopts a binocular bionic eye and a neck mechanism, wherein the neck mechanism drives the motion of the binocular bionic eye; the neck mechanism includes a three-degree-of-freedom neck joint; the binocular bionic eye includes two two-degree-of-freedom eyeball mechanisms. Therefore, the present application achieves the object that the motion of the binocular bionic eye under the drive of the neck mechanism refers to an up-and-down motion, a left-and-right motion, or a rotary motion, thus achieving the technical effects of simplifying structure, realizing effective anti-shake and improving a dynamic performance, and solving the technical problem of complex bionic eye structure and poor anti-shake and dynamic performances.

Figure 5:
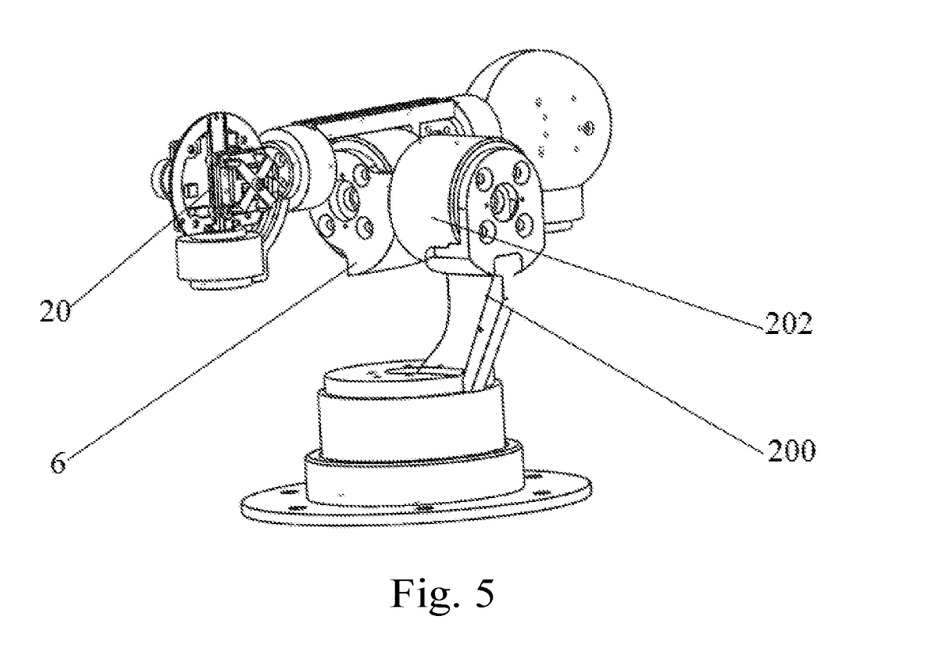
FIG. 5 is a structural schematic view of the bionic eye according to another embodiment of the present application.

According to the embodiments of the present application, as an optional selection in the embodiments, as shown in FIG. 5, the binocular bionic eye 100 includes a right eyeball mechanism 2 and a left eyeball mechanism 1 which have the same internal structure, and a bracket 3, wherein the right eyeball mechanism and the left eyeball mechanism are respectively symmetrically mounted at the ends of the bracket 3. Specifically, the right eyeball mechanism and the left eyeball mechanism have the same structure, and are mounted at the two ends of the bracket 3 in a mirror image symmetric manner.

According to the embodiments of the present application, as an optional selection in the embodiments, as shown in FIG. 5, any one eyeball structure of the left eyeball mechanism and the right eyeball mechanism includes an eyeball 10, a camera module 20, a first eyeball motor 30, and a second eyeball motor 40, wherein the camera module 20 is mounted in the eyeball 10; the first eyeball motor 30 is used to control the left-and-right motion of the eyeball 10; and the second eyeball motor 40 is used to control the up-and-down motion of the eyeball 10.

According to the embodiments of the present application, as an optional selection in the embodiments, as shown in FIG. 5, the neck mechanism 200 further includes a first neck motor 201, a second neck motor 202, and a third neck motor 203, wherein the first neck motor 201 is used to drive the binocular bionic eye to execute a left-and-right rotary motion; the second neck motor 202 is used to drive the binocular bionic eye to execute a left-and-right oscillating motion; the third neck motor 203 is used to drive the binocular bionic eye to execute an up-and-down pitching motion; wherein the output shafts of the first neck motor, the second neck motor and the third neck motor are perpendicular to each other.

Specifically, the neck mechanism 200 has three degrees of freedom, and includes a first neck motor 201, a second neck motor 202, and a third neck motor 203 the output shafts of which are perpendicular to each other, wherein the first neck motor 201 is vertically disposed, and is used to drive the binocular bionic eye to execute a rotary motion; the second neck motor 202 is horizontally disposed, and is used to drive the binocular bionic eye to execute a left-and-right oscillating motion; and the third neck motor 203 is horizontally disposed, and is used to drive the binocular bionic eye to execute an up-and-down pitching motion.

In another embodiment of the present application, in order to enable the structure of the present invention to be compact, simple and practical, the binocular bionic eye and the neck mechanism can be optimized.

The embodiment provides a wide-field-of-view anti-shake high-dynamic bionic eye, including a binocular bionic eye 100 and a neck mechanism 200, wherein the binocular bionic eye 100 includes a left eyeball mechanism 1, a right eyeball mechanism 2 and a bracket 3, the neck mechanism 200 includes a primary support arm 4 and a base 5, the left eyeball mechanism 1 and the right eyeball mechanism 2 adopt the same eyeball structure, and include an eyeball 10, a camera module 20, a first eyeball motor 30 for controlling the left-and-right motion of the eyeball, and a second eyeball motor 40 for controlling the up-and-down motion of the eyeball; the left eyeball mechanism 1 and the right eyeball mechanism 2 are respectively mounted on the bracket 3; the neck mechanism 200 includes a first neck motor 201, a second neck motor 202 and a third neck motor 203 the output shafts of which are perpendicular to each other; the output shaft of the first neck motor 201 is vertically disposed, and is used to drive the binocular bionic eye to execute a left-and-right rotary motion; the output shaft of the second neck motor 202 is horizontally disposed, and is used to drive the binocular bionic eye to execute a left-and-right oscillating motion; and the output shaft of the third neck motor 203 is horizontally disposed, and is used to drive the binocular bionic eye to execute an up-and-down pitching motion.

The left eyeball mechanism 1 has two degrees of freedom, and includes a camera module 20 mounted in the eyeball 10, a first eyeball motor 30 for controlling the left-and-right motion of the eyeball, and a second eyeball motor 40 for controlling the up-and-down motion of the eyeball. The left eyeball mechanism 1 is mounted on a heading bracket 11; and the heading bracket 11 is mounted at a connection on the left of the bracket 3. The right eyeball mechanism 2 and the left eyeball mechanism 1 have the same structure, and are mounted at a connection on the right of the bracket 3 in a mirror image symmetric manner.

Figure 6:
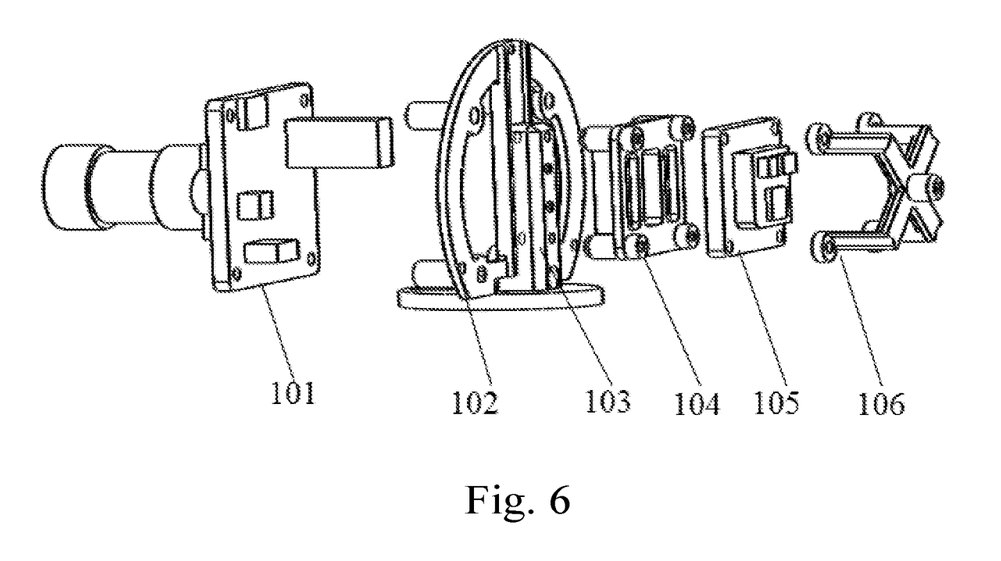
FIG. 6 is an exploded view of the eyeball of the bionic eye according to one embodiment of the present application.

According to the embodiments of the present application, as an optional selection in the embodiments, the eyeball 10 of the left eyeball mechanism 1 and the right eyeball mechanism 2 consists of a front eyeball, a back eyeball, and a camera module, wherein the camera module 20 is located in the eyeball 10.

Specifically, as shown in FIG. 6, the eyeball 10 in the right eyeball mechanism 1 consists of a front eyeball, a back eyeball, and a camera module 20. The camera module 20 is contained in the eyeball 10, and consists of, in an assembly sequence, a camera 101, a camera bracket 102, a motor connector 103, a gyroscope bracket 104, a gyroscope 105, and a back eyeball fixing base 106. In addition, the camera and the gyroscope are connected together via the eyeball mechanism, thus facilitating anti-shake design on algorithm.

According to the embodiments of the present application, as an optional selection in the embodiments, the wide-field-of-view anti-shake high-dynamic bionic eye further includes a motor, wherein the motor integrates an absolute code disk, such that the binocular bionic eye and the neck mechanism can be controlled at the positions with different degrees of freedom. Specifically, in order to ensure that the anti-shake high-dynamic bionic eye structure in the embodiments can be controlled at each degree of freedom position, the motors are all mounted with an integrated absolute code disk to ensure positioning precision.

According to the embodiments of the present application, as a optional selection in the embodiments, the neck mechanism 200 is connected to the binocular bionic eye 100 via a neck cross-linking device 6; the neck mechanism is connected to the base 5; the neck mechanism 200 is connected to the support arm; the first neck motor 201 of the neck mechanism is fixed above the base 5 via a screw, and an outer rotor of the first neck motor is connected to a lower end of the primary support arm 4; the second neck motor 202 is fixed at an upper end of the primary support arm 4 via a screw, and an outer rotor thereof is connected to the neck cross-linking device 6; the third neck motor 203 is fixed in the neck cross-linking device 6 via a screw, and an outer rotor thereof is fixed at an intermediate connection of the bracket 3 via a screw.

Specifically, the first neck motor 201 of the neck mechanism 200 is fixed above the base 5 via a screw, and an outer rotor of the first neck motor 201 is connected to a lower end of the primary support arm 4; the second neck motor 202 is fixed at an upper end of the primary support arm 4 via a screw, and an outer rotor thereof is connected to the neck cross-linking device 6; the third neck motor 203 is fixed in the neck cross-linking device 6 via a screw, and an outer rotor thereof is fixed at an intermediate connection of the bracket 3 via a screw.

The wide-field-of-view anti-shake high-dynamic bionic eye in the embodiments of the present application has a compact structure, a reasonable gravity center design, an optimal rotation moment for each joint, a close distance between two eyes, close distances between the two eyes and the gravity center, and a good physical anti-shake performance. The eyeball mechanism connects the camera and the gyroscope together, thus facilitating anti-shake design on algorithm.

In addition, the wide-field-of-view anti-shake high-dynamic bionic eye in the embodiments of the present application has a concise wire arrangement; a power wire and a signal wire are armored with a metal film to realize mutual shielding; high frequency current and low frequency current are isolated; strong current and weak current are isolated, thus ensuring a power supply state and signal transmission stability.

Obviously, a person skilled in the art should understand that the above-described modules or steps of the present application can be realized via a common computing device, and can be integrated on a single computing device or distributed on a network consisting of a plurality of computing devices; alternatively, the modules and the steps can be realized in the forms of computing device executable program codes; therefore, the modules and the steps can be stored in a storage device, and executed by a computing device, or can be respectively made into integrated circuit modules; alternatively, a plurality of the modules or steps therein can be made into a single integrated circuit module. Therefore, the present application is not limited to any specific hardware and software combinations.

The descriptions above are only optional embodiments of the present application, but not intended to limit the present application. For a person skilled in the art, the present application may have various changes and variations. Any modifications, equivalent substitutions, improvements and the like within the spirit and principles of the present application shall be concluded in the protection scope of the present application.

What is claimed is:

1. A trajectory tracking method based on a bionic eye robot, for a multi-degree-of-freedom linear bionic eye, wherein the multi-degree-of-freedom refers to the degree of freedom of a neck joint and the degree of freedom of a single eyeball joint, the method comprises:
    establishing a linear model according to a bionic eye robot, wherein the linear model comprises at least a gravity vector and a joint vector;
    establishing a full state feedback control system on the basis of the linear model, wherein the full state feedback control system comprises a state feedback controller and a full state feedback control system expression, wherein an angle and an angular velocity state of each joint of the bionic eye are treated as state vectors of the state feedback controller;
    in the full state feedback control system, acquiring an angle and an angular acceleration required for a joint in a target tracking process of the bionic eye on the basis of a preset trajectory expectation value and a preset joint angle expectation value; and
    adopting a linear quadratic regulator (LQR) to calculate a parameter K in the full state feedback control system, and minimizing energy consumption by establishing an energy function, so as to optimize the coordinated head-eye motion control of the linear bionic eye, wherein the parameter K is a system parameter.

2. The trajectory tracking method based on a bionic eye robot according to claim 1, wherein a system input moment matrix in the linear model established according to the bionic eye robot comprises:

$$u = M(q)\ddot{q} + C(q,\dot{q})\dot{q} + B\dot{q} + Gq$$

wherein M is a symmetric positive definite inertia matrix, G is a gravity vector, C denotes a broad sense centrifugal force and Coriolis force matrix, q is a broad sense coordinate matrix, namely a joint vector, and B is a friction coefficient matrix; furthermore, the inertia matrix is:

$$M(q) = D(q) + J$$

wherein J is a diagonal matrix the diagonal elements of which are $r_k^2 J_{m_k}$, $r_k$ is a variable-speed ratio of a motor k, and $J_{m_k}$ is a moment of inertia of the motor k.

3. The trajectory tracking method based on a bionic eye robot according to claim 1, wherein the full state feedback control system expression of the full state feedback control system established on the basis of the linear model comprises:

$$\dot{x} = Ax + Bu$$

$$y = Cx$$

And the input of the state feedback controller is:

$$u = Kx$$

A, B and C respectively represent a matrix.

4. The trajectory tracking method based on a bionic eye robot according to claim 1, wherein the preset trajectory expectation value and the preset joint angle expectation value comprise:
    setting expectation motion trajectories of each joint, wherein x* and u* are preset trajectory expectation values, then:

$$x^* = M_x y_d$$

$$u^* = M_u y_d$$

wherein $y_d$ is a given joint angle expectation value, that is, the angle and the angular acceleration required for a joint in a target tracking process of the bionic eye are solved through the angle expectation value, $M_x$ and $M_u$.

5. The trajectory tracking method based on a bionic eye robot according to claim 1, wherein adopting a linear quadratic regulator (LQR) to calculate a parameter K in the full state feedback control system, and minimizing energy consumption by establishing an energy function, comprises:
    establishing the energy function on the basis of the LQR regulator;

$$J = \frac{1}{2} \int_0^{28} (\Delta x^T Q \Delta x + \Delta u^T R \Delta u) dt$$

wherein the matrix Q is a weight of a performance index function to a state variable, and is a diagonal matrix; and the matrix R is a weight of a control variable, is also a diagonal matrix, and is positive definite.

6. A bionic eye robot, comprising a computer program for, when executed by a processor, realizing the steps of the trajectory tracking method based on a bionic eye robot as claimed in claim 1.

7. A trajectory tracking device based on a bionic eye robot, for a multi-degree-of-freedom linear bionic eye, wherein the multi-degree-of-freedom refers to the degree of freedom of a neck joint and the degree of freedom of a single eyeball joint, the device comprises:
    a linear model module, for establishing a linear model according to a bionic eye robot, wherein the linear model comprises at least a gravity vector and a joint vector;
    a full state feedback control system model, for establishing a full state feedback control system on the basis of the linear model, wherein the full state feedback control system comprises a state feedback controller and a full state feedback control system expression, wherein an angle and an angular velocity state of each joint of the bionic eye are treated as state vectors of the state feedback controller;

an expectation module, for acquiring, in the full state feedback control system, an angle and an angular acceleration required for a joint in a target tracking process of the bionic eye on the basis of a preset trajectory expectation value and a preset joint angle expectation value; and an optimal control module, for adopting a linear quadratic regulator (LQR) to calculate a parameter K in the full state feedback control system, and minimizing energy consumption by establishing an energy function, so as to optimize the coordinated head-eye motion control of the linear bionic eye.

8. The trajectory tracking device based on a bionic eye robot according to claim 7, wherein the optimal control module is used to introduce the linear quadratic regulator (LQR) to the coordinated head-eye motion control of the multi-degree-of-freedom linear bionic eye.

9. A bionic eye, comprising the trajectory tracking device as claimed in claim 8.

10. The trajectory tracking device based on a bionic eye robot according to claim 7, wherein the full state feedback control system module is used to establish the full state feedback control system expression of the full state feedback control system $$\dot{x}=Ax+Bu$$

and the input of the state feedback controller is:

$$u=Kx$$

A, B and C respectively represent a matrix.

11. A bionic eye, comprising the trajectory tracking device as claimed in claim 10.

12. A bionic eye, comprising the trajectory tracking device as claimed in claim 7.

13. A wide-field-of-view anti-shake high-dynamic bionic eye, comprising a binocular bionic eye having the trajectory tracking device of claim 7 and a neck mechanism, wherein the neck mechanism drives a motion of the binocular bionic eye, the neck mechanism comprises a three-degree-of-freedom neck joint, the binocular bionic eye comprises two two-degree-of-freedom eyeball mechanisms, and wherein the motion of the binocular bionic eye under the drive of the neck mechanism refers to an up-and-down motion, a left-and-right motion, a rotary motion, or a combined motion of the three motions above.

14. The bionic eye according to claim 13, wherein when the neck mechanism drives the motion of the binocular bionic eye, the bionic eye is used for binocular tracking.

15. The bionic eye according to claim 14, wherein when the neck mechanism drives the motion of the binocular bionic eye, the bionic eye is used to acquire full scene visual information.

16. The bionic eye according to claim 15, wherein the binocular bionic eye comprises a right eyeball mechanism and a left eyeball mechanism which have the same internal structure, and a bracket, wherein the right eyeball mechanism and the left eyeball mechanism are respectively symmetrically mounted at the ends of the bracket.

17. The bionic eye according to claim 16, wherein each of the left eyeball mechanism and the right eyeball mechanism comprises an eyeball, a camera module, a first eyeball motor, and a second eyeball motor, wherein the camera module is mounted in the eyeball, the first eyeball motor is used to control left-and-right motion of the eyeball, and the second eyeball motor is used to control the up-and-down motion of the eyeball.

18. The bionic eye according to claim 13, wherein the neck mechanism further comprises a first neck motor, a second neck motor, and a third neck motor, the first neck motor is used to drive the binocular bionic eye to execute a left-and-right rotary motion;

the second neck motor is used to drive the binocular bionic eye to execute a left-and-right oscillating motion;

the third neck motor is used to drive the binocular bionic eye to execute an up-and-down pitching motion;

wherein the output shafts of the first neck motor, the second neck motor and the third neck motor are perpendicular to each other.

19. The bionic eye according to claim 18, further comprising a motor, wherein the motor integrates an absolute code disk, such that the binocular bionic eye and the neck mechanism is configured to be controlled at the positions with different degrees of freedom.

20. The bionic eye according to claim 18, further comprising a base and a support arm, wherein the neck mechanism is connected to the binocular bionic eye via a neck cross-linking device, the neck mechanism is connected to the base, the neck mechanism is connected to the support arm;

the first neck motor of the neck mechanism is affixed above the base via a screw, and an outer rotor of the first neck motor is connected to a lower end of a primary support arm;

the second neck motor is affixed at an upper end of the primary support arm via a screw, and an outer rotor thereof is connected to the neck cross-linking device; and the third neck motor is affixed in the neck cross-linking device via a screw, and an outer rotor thereof is affixed at an intermediate connection of the bracket via a screw.

\* \* \* \* \*